May 13, 1924.

J. STREDA

ROD FOR CONNECTING THE DRIVING CRANK WITH THE OPERATING
ARM OF EARTH BORING DEVICES

Filed Dec. 4, 1922

1,494,196

2 Sheets-Sheet 1

Inventor:
Joseph Streda

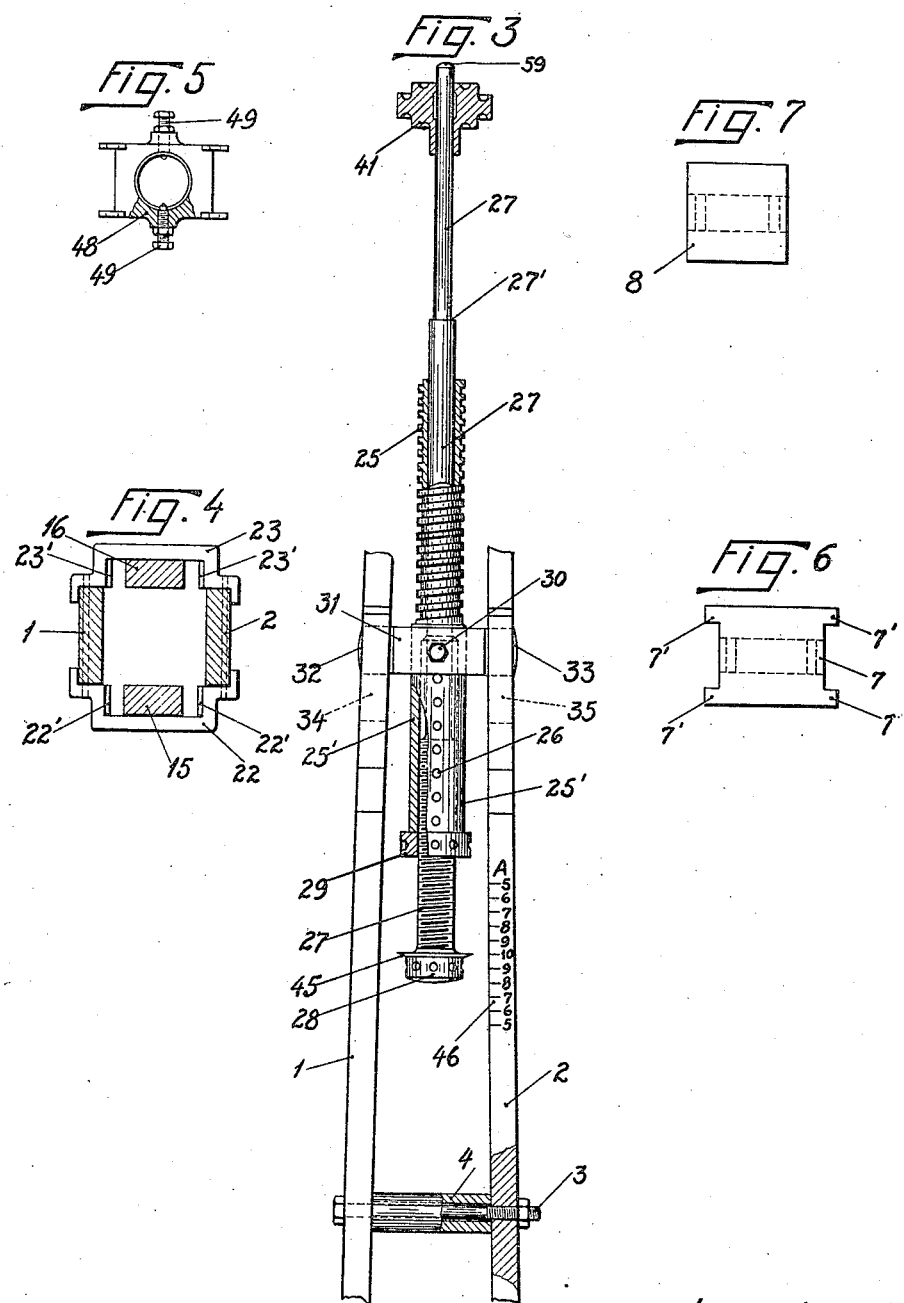

Patented May 13, 1924.

1,494,196

UNITED STATES PATENT OFFICE.

JOSEPH STREDA, OF LONDON, ENGLAND.

ROD FOR CONNECTING THE DRIVING CRANK WITH THE OPERATING ARM OF EARTH-BORING DEVICES.

Application filed December 4, 1922. Serial No. 604,946.

*To all whom it may concern:*

Be it known that I, JOSEPH STREDA, a citizen of the Czechoslovakian Republic, residing at London, England, have invented certain Improvements in Rods for Connecting the Driving Crank with the Operating Arm of Earth-Boring Devices, of which the following is a specification.

This invention relates to a connecting-rod such as used in earth boring devices for connecting the driving crank with the operating arm, and consists in controlling the two connecting points by means of adjustable springs so that both the pull and the thrust will be resilient and so that, by the reaction of the springs, the dropping of the boring tool will be accelerated.

Figure 1:
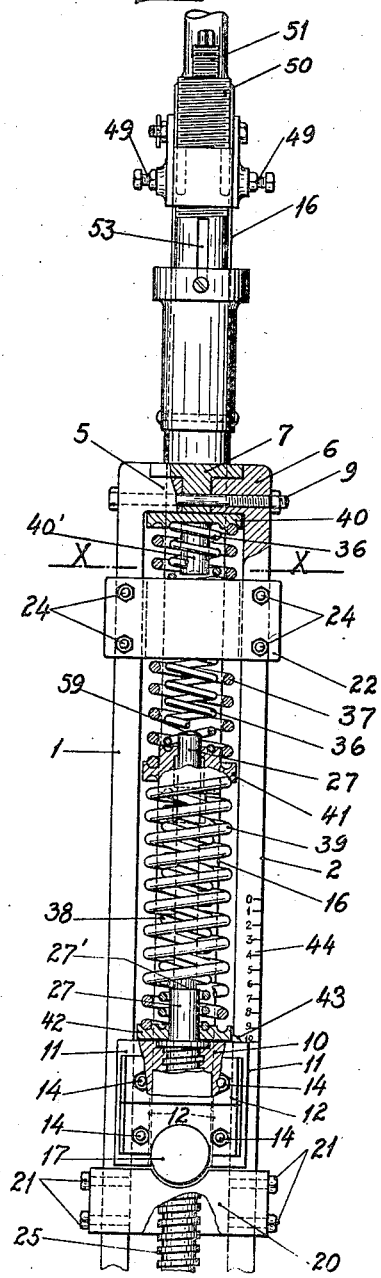
Figure 2:
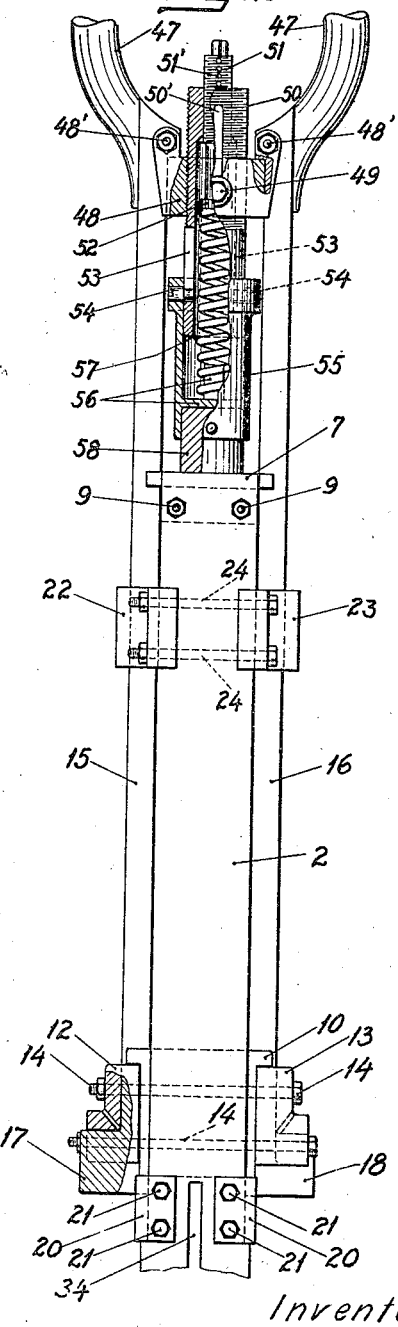

Fig. 1 of the accompanying drawings represents a side view, partly in section, of the upper part of the connecting rod, Fig. 2, a view, also partly in section, at right angles to Fig. 1, and Fig. 3, a view of a lower part of the rod.

Fig. 4 is a cross-section on the line X—X of Fig. 1,

Fig. 5, a plan of one of the details.

Fig. 6, a plan of another detail, and

Fig. 7, a view showing a modification of the element according to Fig. 6.

The lower part of the connecting-rod is composed of two arms 1 and 2 which are distanced by means of bolts 3 and stay tubes 4. The upper ends of the rod are formed with heads 5 and 6 which are clamped to a striking plate 7 by means of a screw-bolt 9. The upper part of the rod is also composed of two arms 15 and 16 which overlap the arms 1 and 2 but which are arranged in a plane at right angles to that of the latter arms. A cross-head 10 is slidably guided on the arms 1 and 2 by means of laterally extending guide members 11, and to this cross-head is connected, by means of bolts 14, a pair of diametrically opposed saddle pieces 12 and 13. The lower ends of the arms 15 and 16 are formed with pivot pins 17 and 18 respectively which bear against the hollowed saddle pieces 12 and 13 from below and which are themselves supported in the lowest position on two brackets 20 secured to the arms 1 and 2 by means of screws 21. Another pair of brackets 22 and 23 is secured by means of bolts 24 near the ends of the arms 1 and 2 as guides for the arms 15 and 16 which are capable, as shown in Fig. 4, of a slight oscillating movement about the pivots 17 and 18 between the inner faces 22', 23' of the brackets. The upper ends of the arms 15 and 16 carry the shackle 47 by means of which the connecting rod is attached to the operating arm of the boring device, and they are connected at 48' to lugs formed on a nut 48, the latter being held between the arms. A hollow screw 50 is fitted in the nut 48, and in the upper end of the screw is fitted another screw 51. The lower end of the screw 50 is without screw-thread, and on it is guided a casing 55. The latter has a transverse wall 56 carrying a central stud which guides the lower end of the coil spring 57 whose upper end bears against a head formed on the lower end of the screw 51. Transverse screws 54 are held in the casing 55 so as to engage longitudinal slots 53 in the screw 50 and prevent a separation of the two elements. In the lower end of the casing 55 is fitted an elastic plug 58 of rubber or the like which is arranged so as to strike against the plate 7 and act as a buffer. The buffer action is regulated by an adjustment of the screws 50 and 51 relative to one another and to the nut 48. Setscrews 49 fitted in the nut 48 take through longitudinal slots 50' in the screw 50 and engage recesses 51' in the screw 51, thereby securing both screws in adjusted position.

A hollow screw-spindle 25 with square thread, is fitted in the cross-head 10. The lower part 25' of this spindle is without screw thread and carries upon it a collar 31 which can be secured in various positions on the spindle by means of a setscrew 30. Lugs 32 and 33, connected to the collar 31, engage longitudinal slots 34 in the arms 1 and 2 so as to guide the spindle in its movements together with the crosshead. The spindle has at its extreme lower end a capstan head 29 by means of which it can be adjusted relative to the cross-head, the collar 31 being adjusted to correspond. Another spindle 27 is screwed into the lower end of the spindle 25 and passes right through and beyond the latter. This spindle is also adjustable by means of a capstan head 28, and the adjustment is made with reference to a scale 46 on the arm 2. the head 28 having a projecting, sharp-edged flange 45 opposite which the readings are taken. Apertures, of which there are preferably four longitudinal, equidistant rows on the spindle 25, admit the set-screw 30 to the spindle 27 so as to secure both spindles in adjusted position. Only the lower portion of the spindle 27 is screw-threaded. The rest is plain and partly reduced so that a shoulder 27' is formed some distance down the spindle. Two sets of concentric coil springs are arranged in alignment between the cross-head 10 and the connecting heads 5, 6 of the rods 1 and 2 so as to force one set of arms downwards and the other upwards. The inner ends of the springs bear against and are guided by a collar 41 arranged on the reduced upper end of the spindle 27. The lower springs 38 and 39 bear through the medium of a washer 42 against the upper end of the screw spindle 25. The top springs 36 and 37 bear with their upper ends against the heads 5, 6 through the medium of a plate 40. The latter has a central stud 40' whereby it guides the inner spring. There is on the arm 2 a scale 44 relative to which the screw-spindle 25 is adjusted, the washer 42 being for this purpose provided with a pointer 43.

The lower end of the connecting-rod is connected to the driving crank in the usual manner. When the crank pin descends, the boring tool is raised, and the springs which bear against the cross-head are compressed. As the crank pin passes the dead centre, the springs recover so as to raise the tool to the highest position, and then the buffer 58 is applied to the striking plate 7. This results in a compression of the spring 57 which, in recovering while the crank pin ascends, advances the shackle 47 and allows the boring tool to drop freely and with great force. The resiliency of the connecting-rod, moreover, reduces the shocks and prolongs the life of the various mechanical elements.

The construction of the device allows a considerable variation in the spring pressure as well as in the compressing movement of the cross-head so as to meet all requirements and working conditions. The spring pressure is regulated by means of the screw spindle 25 with reference to the scale 44. The extent of the compression is limited by the spindle 27 the upper end 59 of which strikes against the stud 40', the collar 41 being at the same time engaged by the shoulder 27'. This movement can be regulated by setting the spindle 27 relative to the scale 46. Thus a low or high spring pressure can be combined with a long or short compressing movement according to requirements. By the abutment of the spindle 27 against the stud 40', moreover, an over-compression of the springs is prevented. In some instances it may be necessary to have a rigid connecting rod, and the spindle 27 is screwed right up, the indicating flange 45 being set at A on the scale. A wide adjustment of the buffer is also provided for by the arrangement of the screws 50 and 51, one of which varies the position of the buffer relative to the striking plate 7 and the other the actual pressure of the spring.

The pivotal arrangement of the arms 15 and 16 enables the connecting rod to take up the vibrations which otherwise would be communicated to the boring bench. The pivotal oscillations may or may not be allowed, according to circumstances, and for this purpose two different striking plates are provided as shown in Figs. 6 and 7. The plate according to Fig. 6 is used when a rigid rod is required and is formed with lugs 7' which prevent the arms 15 and 16 from oscillating about the pivots 17 and 18. The plate 8 shown in Fig. 7 is without such lugs and allows the lugs to oscillate.

I claim:—

1. A connecting-rod for use between the driving crank and the boring beam of an earth boring device, comprising two pairs of spaced, overlapping arms, a connecting head holding the ends of one pair of arms, a cross-head slidably guided on the same pair of arms and pivotally connected to the other pair of arms, a resilient buffer connected to said latter pair of arms so as to take the thrust of the connecting head, and coil springs arranged between the two heads so as to be compressed by a pull on the rod.

2. A connecting-rod for use between the driving crank and the boring beam of an earth boring device, comprising two pairs of spaced, overlapping arms, a connecting head holding the ends of one pair of arms, a cross-head slidably guided on the same pair of arms and pivotally connected to the other pair of arms, a resilient buffer connected to said latter pair of arms so as to take the thrust of the connecting-head, coil springs arranged between the two heads so as to be compressed by a pull on the rod, and brackets arranged so as to support the cross-head in the extreme position on the opposite pair of arms.

3. A connecting-rod for use between the driving crank and the boring beam of an earth boring device, comprising two pairs of spaced, overlapping arms, a connecting-head holding the ends of one pair of arms, a cross-head slidably guided on the same pair of arms and pivotally connected to the other pair of arms, a resilient buffer connected to said latter pair of arms so as to take the thrust of the connecting-head, coil springs arranged between the two heads so as to be compressed by a pull on the rod, a hollow screw spindle fitted in the cross-head so as to take the thrust of the spring and allow a regulation of the spring pressure, and a second screw-spindle fitted in and passing through the hollow spindle into the springs so that it can be adjusted for limiting the compression of the springs by abutment against the connecting head.

4. A connecting-rod for use between the driving crank and the boring beam of an earth boring device, comprising two pairs of spaced, overlapping arms, a connecting-head holding the ends of one pair of arms, a cross-head slidably guided on the same pair of arms and pivotally connected to the other pair of arms, a buffer connected to said latter pair of arms so as to take the thrust of the connecting-head, two coaxial sets of concentric coil springs arranged between the two heads so as to be compressed by a pull on the rod, a hollow screw-spindle fitted in the cross-head so as to take the thrust of the springs and allow a regulation of the spring pressure, a second screw-spindle fitted in and passing through the hollow spindle into the spring so as to limit the compression of the latter by abutment against the connecting-head, a collar arranged between the two sets of springs and guided on a reduced plain portion of the second spindle so as to be engaged by the shoulder behind it when the end of the spindle reaches the connecting-head, a collar arranged on the hollow spindle and guided on the adjacent arm, and a set-screw fitted in said latter collar, the hollow spindle having apertures through which to admit said set-screw for securing the two spindles in adjusted position to the collar.

5. A connecting-rod for use between the driving crank and the boring beam of an earth boring device, comprising two pairs of spaced, overlapping arms, a connecting-head holding the ends of one pair of arms, a cross-head slidably guided on the same pair of arms and pivotally connected to the other pair of arms, a buffer connected to said latter pair of arms so as to take the thrust of the connecting-head, two coaxial sets of concentric coil springs arranged between the two heads so as to be compressed by a pull on the rod, a hollow screw-spindle fitted in the cross-head so as to take the thrust of the springs and allow a regulation of the spring pressure, a second screw-spindle fitted in and passing through the hollow spindle into the springs so as to limit the compression of the latter by abutment against the connecting-head, the arms on which the cross-head is guided being formed with scales relative to which the screw-spindle can be adjusted for regulating the spring pressure and the spring compression, a collar arranged between the two sets of springs and guided on a reduced portion of the second spindle so as to be engaged by the shoulder behind it when the end of the spindle reaches the connecting-head, a collar arranged on the hollow spindle and guided on the adjacent arms, and a set-screw fitted in said latter collar, the hollow spindle having apertures through which to admit said set-screw for securing the two spindles in adjusted position to the collar.

6. A connecting-rod for use between the driving crank and the boring beam of an earth boring device, comprising two pairs of spaced, overlapping arms, a connecting-head holding the ends of one pair of arms, a cross-head slidably guided on the same pair of arms and pivotally connected to the other pair of arms, a resilient buffer connected to said latter pair of arms so as to take the thrust of the connecting-head, a striking plate supported by said connecting-head for engagement with the buffer, coil springs arranged between the two heads so as to be compressed by a pull on the rod, and means for regulating the resiliency of said springs and of the buffer.

7. A connecting-rod for use between the driving crank and the boring beam of an earth boring device, comprising two pairs of spaced, overlapping arms, a connecting-head holding the ends of one pair of arms, a cross-head slidably guided on the same pair of arms and pivotally connected to the other pair of arms, a resilient buffer connected to said latter pair of arms so as to take the thrust of the connecting-head, a striking plate supported by said connecting-head for engagement with the buffer, said striking plate being formed with projecting lugs wherewith to limit the oscillating movements of the pivoted arms, coil springs arranged between the two heads so as to be compressed by a pull on the rod, and means for regulating the resiliency of the springs and of the buffer.

8. A connecting-rod for use between the driving crank and the boring beam of an earth boring device, comprising two pairs of spaced, overlapping arms, a connecting-head holding the ends of one pair of arms, a cross-head slidably guided on the same pair of arms and pivotally connected to the other pair of arms, a spring-controlled rubber-faced buffer connected to said latter pair of arms so as to take the thrust of the connecting-head, means for holding the buffer in a more or less advanced position relative to the connecting-head, means for regulating the pressure of the buffer spring, coil springs arranged between the two heads so as to be compressed by a pull on the rod, and means for regulating the pressure of said latter springs.

JOSEPH STREDA.